United States Patent [19]

Murakami et al.

[11] 3,971,865

[45] July 27, 1976

[54] ADHESIVE RESIN COMPOSITION

[75] Inventors: Masao Murakami; Akio Amaya; Masaru Kawakita, all of Utsunomiya, Japan

[73] Assignee: Sony Corporation, Tokyo, Japan

[22] Filed: Apr. 9, 1975

[21] Appl. No.: 566,224

[52] U.S. Cl. ............................ 428/40; 156/331; 260/23.7 N; 260/32.8 A; 260/32.8 N; 260/857 D; 427/207; 428/201; 428/215; 428/355; 428/458; 428/462; 428/474; 428/517; 428/519; 428/521

[51] Int. Cl.² ..................... C09J 7/02; C09J 3/12; C09J 3/16; B32B 7/12

[58] Field of Search ........ 260/18 N, 23.7 N, 32.6 A, 260/857 D, 32.8 A, 32.8 N; 428/40, 213, 214, 215, 335, 337, 339, 343, 355, 458, 462, 474, 517, 519, 521, 209, 201; 156/331; 427/207, 208

[56] References Cited
UNITED STATES PATENTS

| | | | |
|---|---|---|---|
| 2,572,877 | 10/1951 | Morris et al. | 156/331 |
| 2,955,951 | 10/1960 | Aelony | 260/18 N |
| 3,367,893 | 2/1968 | Halbartschlager | 260/857 D |
| 3,444,026 | 5/1969 | Peerman | 428/474 |
| 3,484,403 | 12/1969 | Brunson et al. | 156/331 |
| 3,819,473 | 6/1974 | Russell et al. | 428/474 |

OTHER PUBLICATIONS

Skeist, Irving, Handbook of Adhesives, Reinhold Publishing Corp., N.Y., 1962, pp. 229–247, 255–267, 425–433.

*Primary Examiner*—Marion E. McCamish
*Assistant Examiner*—Charles E. Lipsey
*Attorney, Agent, or Firm*—Hill, Gross, Simpson, Van Santen, Steadman, Chiara & Simpson

[57] ABSTRACT

An adhesive composition comprised of a nitrile rubber having carboxyl groups and a polyamide resin derived from polymeric fatty acids and alkylene polyamines. Such adhesive compositions are useful upon sheet members of plasticized polyvinylchloride, among other possible uses.

20 Claims, 3 Drawing Figures

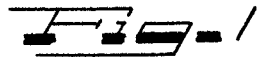
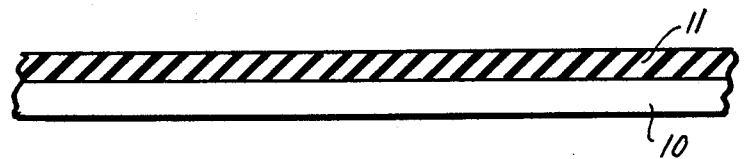
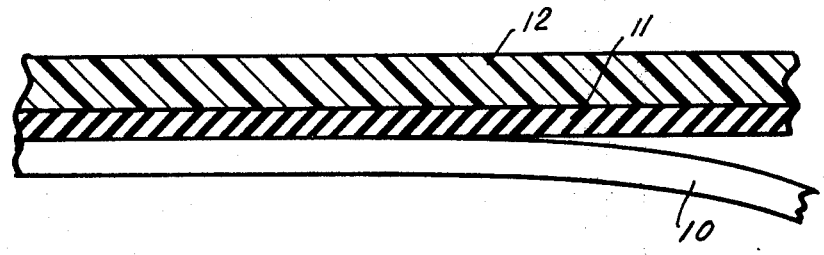
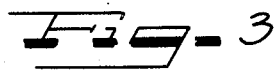
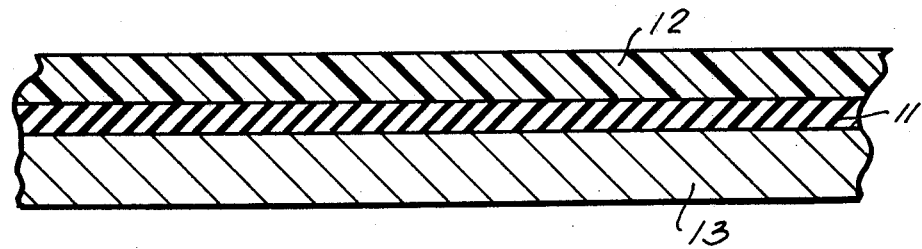

ADHESIVE RESIN COMPOSITION

BACKGROUND OF THE INVENTION

1. Field of the Invention

The present invention generally relates to an adhesive composition, and particularly to an adhesive composition which has good adhesive strength, stability, over a wide temperature range, and resistance to naphthenic oils and plasticizers.

2. Description of the Prior Art

A prior art adhesive composition containing a nitrile rubber with carboxyl groups is composed of 100 parts of Hycar-1072 (Trade Name by Goodrich Co., Ltd.) and from 20 to 50 parts of either an alkyl-phenol resin or a vinylchloride-vinylacetate copolymer. Hycar-1072 is a nitrile-butadiene rubber with carboxyl groups. This Hycar-1072 is dissolved in a solvent, together with an alkyl-phenol resin or the like, to prepare a rubber solution. Thereafter, the thus prepared rubber solution is coated on, for example, a polyethylene film, and the coating is dried. Then, the resulting polyethylene film is laminated to a polyvinylchloride film and thereafter the polyethylene film is stripped therefrom to produce a polyvinylchloride sheet with an adhesive layer thereon. However, the adhesive force of this adhesive layer to such polyvinylchloride sheet is generally low; particularly at relatively high and low temperatures. Thus, for example, when the temperature is decreased to $-10°C.$, the adhesive force becomes almost zero, and when the temperature raised to 80°C., the adhesive force is decreased to about 0.6Kg/2cm, when an adhesive layer is laminated to an aluminium foil.

In addition, when such a prior art adhesive composition is laminated to, for example, polyvinylchloride film, phthalates which are compounded in the polyvinylchloride film as a plasticizer, undesirably become dissolved in the alkyl-phenol polymer which is contained in such adhesive composition and, also, the polyvinylchloride film becomes undesirably contracted at the places where such phthalates are so removed therefrom by such dissolution. The result is a deterioration in adhesive characteristics between such adhesive layer and such polyvinylchloride film.

A prior art adhesive composition comprised of polyamide resins derived from polymeric fatty acids and alkylene polyamines is described in U.S. Pat. No. 2,955,951 and U.S. Pat. No. 3,444,026, and a method of making polyamide resins similar to those used in this invention is described in U.S. Pat. No. 3,396,180 and U.S. Pat. No. 3,408,317.

Above mentioned polyamide resin compositions, have a good adhesive characteristic at ambient temperatures but have unsatisfactory adhesive bond strength at both relatively low and relatively high temperatures.

SUMMARY OF THE INVENTION

The present invention is concerned with an adhesive composition containing (1) a nitrile rubber with carboxyl groups, and (2) a polyamide resin, respectively, as the principal components thereof. In such a composition, the carboxyl groups of the nitrile rubber and the amino groups in the polyamide resin react with each other to partially form a bond of the type: —CONH—, or an electrostatic bond, thereby to form a kind of salt. As a result, the nitrile rubber and polyamide resin in an adhesive composition of this invention are tightly bound to each other and can be considered to exhibit a state wherein the nitrile rubber is cross-linked, (though there is no intent herein to be bound by theory), and, hence, an adhesive composition results which exhibit great adhesive force yet is stable at relatively low and high temperatures.

A primary aim of the present invention is to provide an adhesive composition which has a characteristically high bond strength (or adhesive force) over an extremely wide temperature range.

Another primary aim of this invention is to provide an adhesive composition of the type indicated which additionally has substantially no tendency to absorb or dissolve plasticizers or other materials used in the preparation and compounding of plastic sheeting, such as vinyl polymer sheets and films like polyvinylchloride.

Another aim of this invention is to provide an adhesive composition of the type indicated which is formed from a nitrile rubber containing pendant carboxyl groups and a polyamide resin formed by the condensation polymerization of polymeric fatty acids with an alkylene polyamine.

Another aim of this invention is to provide laminates in which one integral layer thereof is an adhesive composition of the class and character above indicated.

Another aim of this invention is to provide laminates of the type indicated wherein a base substrate carries an adhered layer of such an adhesive composition and such base substrate is releasable from such adhesive composition.

Another aim of this invention is to provide laminates wherein a base substrate of the vinyl polymer type carries an adhered layer of an adhesive composition, such vinyl polymer being compounded with plasticizers particularly those of the phthalate class.

Other and further aims, objects, purposes, advantages, and the like will be apparent to those skilled in the art from the present specification taken with the accompanying drawings.

BRIEF DESCRIPTION OF THE DRAWINGS

In the drawings:

FIG. 1 is a vertical sectional view through one type of laminate embodiment using as one layer an adhesive composition of this invention;

FIG. 2 is a view similar to FIG. 1 but showing another such embodiment; and

FIG. 3 is a view similar to FIG. 2 but showing still another such embodiment.

DETAILED DESCRIPTION

The adhesive compositions of this invention comprise an intimate mixture of a nitrile rubber having carboxyl groups and a polyamide resin.

The nitrile rubbers used in the practice of the invention are terpolymers comprised of acrylonitrile, butadiene, and on a 100 weight percent total nitrile rubber weight basis, from about 0.5 to 7 weight percent of at least one material selected from the group consisting of acrylic acid and methacrylic acid.

The weight ratio of acrylonitrile to butadiene in such a nitrile rubber ranges from about 15/85 to 50/50. Also, such a nitrile rubber has a molecular weight greater than about $10^5$, and such a nitrile rubber has an initial solubility such that at most about 28 parts by weight thereof are soluble in 100 parts by weight of methyl ethyl ketone at ambient temperatures.

A preferred class of nitrile rubbers adapted for use in the practice of this invention is comprised on a 100 weight percent total nitrile rubber basis of from about 30 to 40 weight percent acrylonitrile, from about 60 to 70 weight percent butadiene, and from about 1 to 3 weight percent acrylic acid, and such preferred nitrile rubber has a Mooney viscosity of from about 40 to 75 $ML_8$ at 100°C. Within such preferred class, a more preferred group of suitable nitrile rubbers is comprised on a 100 weight percent total composition basis of about 35 weight percent acrylonitrile, about 63 weight percent butadiene, and about 2 weight percent acrylic acid. Commercially available examples of nitrile rubbers with carboxyl groups suitable for use in this invention include Hycar-1072 and Hycar-1472 by Goodrich Company, which are terpolymers reportedly comprised of 35 weight percent acrylonitrile, 63 weight percent butadiene and 2 weight percent acrylic acid on a 100 weight percent total weight basis. They each have a 42–62 $ML_8$ (100°C.) Mooney viscosity of a molecular weight more than $10^5$.

1. If the content of such acrylic acid and/or methacrylic acid is less than about 0.5 weight percent, a small number of the reaction sites in a rubber polymer molecular result where carboxyl groups are available to cross-link with amino groups of the above said polyamide forming amide bonds by dehydration condensation which causes a deterioration in the adhesive force and cohesive force desired for composition of this invention. On the other hand, if the content of such material is more than about 7 weight percent, the number of such reaction sites is so large that the incidence of crosslinking points causes a deterioration in the adhesive force desired for a composition of this invention apparently because of undesirable initial gelatinization in an adhesive solution.

2. If the content of acrylonitrile in a nitrile-rubber employed in this invention is less than about 15/85, the solubility of the nitrile rubber in naphthenic oils is so high that deterioration of adhesive characteristics in a product composition of this invention results apparently caused by a swelling of the adhesive layer with the naphthenic oils.

3. On the other hand, if the content of acrylonitrile in such a nitrile-rubber is more than about 50/50, excessive embrittlement of a layer of an adhesive composition of this invention results, especially at relatively low temperatures and results also in a deterioration of the desired adhesive characteristics.

The polyamide resins used in the practice of this invention are formed by the condensation polymerization of polymeric fatty acids with at least one alkylene-polyamine. The polymeric fatty acids used in making such a polyamide are polymerized from monocarboxylic aliphatic acids having from 8 through 24 carbon atoms per molecule, and further having a molecular weight ranging from about 140 to 400.

The alkylene-polyamines used in making such a polyamide are characterized by having the generic formula:

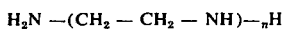

$$H_2N-(CH_2-CH_2-NH)-_nH$$

where $n$ is an integer of from 1 through 5. Such polyamide resin are further characterized by having an amine value of from about 90 to 350 and by having a molecular weight of from about 500 to 5,000.

The polyamide resins used in this invention can be made by the condensation polymerization of polymeric fatty acids with alkylene-polyamines by using a method of manufacture similar to that described in U.S. Pat. No. 3,396,180 and U.S. Pat. No. 3,408,317.

A preferred class of polymeric fatty acids to be used for making polyamide resins adapted for use in this invention is comprised on a 100 weight percent total polymeric fatty acid basis of from about 70 to 80 weight percent dimers, from about 15 to 30 weight percent trimers, and from about 1 to 5 weight percent monomers.

A preferred class of alkylene-polyamines to be used for making polyamide resins adapted for use in this invention comprises amines in the group comprising ethylene diamine, diethylene triamine, and triethylene tetramine.

Preferred polyamide resins made from such preferred polymeric fatty acids and such preferred alkylene-polyamines have molecular weights such that their respective viscosities range from about 5,000 to 80,000 cps at 40°C. by Brookfield viscometer and their respective amine values range from about 90 to 360. Within such preferred class, a more preferred group of suitable polyamide resins has members each with a viscosity in the range from about 8,000 to 12,000 cps at 40°C. by Brookfield viscometer and each with an amine value of about 300 ± 20. Commercially available examples of polyamide resins suitable for use in this invention include Tohmide 210, Tohmide No. 215, and Tohmide No. 240 (Trade names of Fuji Chemical Industries, Co., Ltd.). These resins are made by the dehydrocondensation of tall oil fatty acids as the polymeric fatty acids (comprised of 75% dimer, 22% trimers and 3% monomer) which are polymerized by $C_{18}$ fatty acids, such as ricinoleic acid (12 - hydroxy - cis - 9 - octadecenoic acid), linoleic acid, linolenic acid, oleic acid, and the like, with alkylene-polyamines, which can be expressed as $H_2N-(CH_2-CH_2-NH)-_nH$ where $n$ is an integer from 1 to 5, such as ethylene diamine, disethylene triamine, triethylene tetramine and the like:

Each of these above mentioned resins is further characterized as follows:

Tohmide No. 210 (Made from polymerized tall oil fatty acids and diethylene-triamine. The average molecular weight is about 4500, and the amine value is in the range of 100±5, and the viscosity is more than $10^5$ cps at 40°C. by Brookfield viscometer.)

Tohmide No. 215 (Made from polymerized tall oil fatty acids and triethylene-tetramine. The average molecular weight is about 2500, the amine value is in the range of 220±15, and the viscosity ranges between 70,000 and 50,000 cps at 40°C. by Brookfield viscometer.)

Tohmide No. 225x (Made from polymerized tall oil fatty acids and triethylene-tetramine. The average molecular weight is about 1000, the amine value is in the range of 300±20 and the viscosity ranges between 12000 and 8000 cps at 40°C. by Brookfield viscometer.)

Thomide No. 240 (Made from polymerized tall oil fatty acids and triethylene-tetramine. The average molecular weight is about 600, the amine value is in the range of 330±20, and the viscosity ranges between 2500 and 100 cps at 25°C. by Brookfield viscometer.)

The above mentioned amine values are defined as milligrams of KOH which correspond to the amount of HCl which neutralizes one gram of give polyamides as amines.

To prepare an adhesive composition of this invention, any conventional adhesive preparation procedure may be used. One convenient procedure involves dissolving each of the starting nitrile rubber and starting polyamide resins in a separate solution of some suitable organic solvent and then thereafter mixing the resulting two solutions together to produce a product solution containing the respective starting polymers in a desired weight ratio, the exact mixing ratio in any given preparation situation being preferably determined by the product viscosity and softening point desired. Any conventional organic carrier can be used, but polar solvents, such as ketones, are preferred. A product adhesive composition is typically and preferably in the form of a fluid which can be conventionally coated upon some substrate. In such fluid the adhesive composition of this invention may be present as a dissolved or dispersed (colloided) solid system.

1. Such a fluid adhesive composition comprises on a 100 weight percent total fluid composition basis from about 10 to 55 weight percent of an adhesive composition of this invention with the balance up to 100 weight percent of any given such fluid composition being an inert, volatile, organic liquid, such adhesive composition is uniformly dispersed throughout such organic liquid.

Accordingly, an adhesive composition of this invention can employ a ratio of from about 0.5 to 100 parts by weight of polyamide resin per each 100 parts by weight of nitrile rubber, and preferably, such an adhesive composition has a ratio of from about 3 to 30 parts by weight of polyamide resin per each 100 parts by weight of nitrile rubber.

Optimally, an adhesive composition of this invention can contain relatively minor quantities of other materials known to those skilled in the art. Examples of suitable such additives include alkyl-phenol resins, ester gums, or the like, in a ratio of from about 10 to 20 parts by weight of such additive per 100 parts by weight of the nitrile rubber in order to increase the adhesive property of a product composition.

In general, conventional methods of adhesive use may be employed in utilizing an adhesive composition of the present invention. In one type of application, an adhesive composition of this invention is coated upon a substrate, such as a sheet member, by painting, roller transfer, spraying, or the like. Preferred sheet members can range from 50 to 500$\mu$ in thickness, though, as those skilled in the art will appreciate, any convenient substrate may be employed regardless of thickness or shape.

A particularly convenient substrate for initial application of an adhesive composition of this invention comprises an organic polymeric sheet or film member from which such adhesive composition is releasable. Conventional release sheet members can be employed, as can conventional release agents, such as silicones and the like. One preferred release sheet member class comprises polyolefins, and a preferred such polyolefin sheet member is a biaxially oriented polyethylene film.

A particularly useful application for the adhesive compositions of this invention is in laminate constructions wherein a sheet member comprised of an organic polymer is bonded to some other material, particularly sheet member comprised of, for one class, a vinyl polymer which has been plasticized with a plasticizer, such as one of the phthalates. For example, such a sheet member can comprise on a 100 weight percent basis from about 85 to 65 weight percent of at least one vinyl polymer and from about 15 to 35 weight percent of an phthalate plasticizer. A particularly useful vinyl polymer is polyvinylchloride. An adhesive composition of this invention characteristically displays no tendency to absorb plasticizers, such as phthalate plasticizers, yet, at the same time, displays excellent adhesive characteristics. Adhesive compositions of this invention are also useful for making laminates wherein one layer thereof is a metal, such as aluminum or a ferrous metal, which is bonded to another layer of superstrate (organic or inorganic) through a layer of an adhesive composition of this invention. Typically, in a laminate construction using a layer comprised of an adhesive composition of this invention, such layer ranges in thickness from about 40 to 60$\mu$ through thicker and thinner such layers can be used as those skilled in the art will readily appreciate.

The drawings illustrate diagrammatically the work reported in Example 6 below. Thus, in FIG. 1, sheet member 10 is the bilaterally oriented polyethylene film and layer 11 is comprised of adhesive composition of this invention.

FIG. 2 layer 11 has been laminated to the polyvinylchloride film 12, and sheet member 10 is being peeled away from layer 11 to leave layer 11 bonded to film 12.

In FIG. 3, layer 11 has been bonded with heat and pressure to the melamine printed iron plate 13 to produce the product laminate.

When an adhesive composition of this invention is laminated to polyvinylchloride film or the like, the adhesive components thereof, including the polyamide resin, are stable to plasticizers contained in the resulting laminated film so that there is no danger of contraction in the laminated film.

EMBODIMENTS

The present invention is further illustrated by reference to the following Examples. Those skilled in the art will appreciate that other and further embodiments are obvious and within the scope of this invention from the teachings of these present examples taken with the accompanying specification and drawings. All parts are parts by weight, unless others are indicated.

EXAMPLE 1

For the preparation of this inventive adhesive composition, Hycar-1072 (made by Goodrich Co., Ltd.) is used as the nitrile rubber with carboxyl groups, and Tohmide No. 225X (made by Fuji Chemical Industries, Ltd.) is used as the polyamide resin.

Initially, for this series of adhesive compositions, the Hycar-1072 is dissolved in methylethyl-ketone to prepare a polymer solution having a solids content of about 20% by weight (total weight basis). Next, the polyamide resin is mixed with portions of the aforesaid nitrile rubber in the respective ratios of 2, 6, 10, 30 and 50 parts by weight against 100 parts by weight of nitrile rubber to prepare respective liquid adhesive compositions at room temperature. Then, the following exemplary tests and evaluations are carried out.

EXAMPLE 2

A biaxially oriented polyethylene film produced by high-tension method and having a film thickness of about 65 microns is coated by an adhesive composition which has prepared as mentioned above. The resulting coating is then dried by heated air at 80°C. for 3 minutes to form an adhesive layer of about 30 microns thick on the polyethylene film. Next, the above polyethylene film is laminated on its adhesive layer side to a polyvinylchloride film of about 150 microns thickness which film contains 25 weight percent of dioctylphthalate as a plasticizer. Thereafter, the polyethylene film is peeled off leaving the adhesive layer bonded to the polyvinylchloride film as an adhesive layer.

This polyvinylchloride film is applied by heated press onto the surface of a melamine-printed iron plate under a pressure of 1 Kg/cm² at a temperature of 80°C. for 30 seconds. After the completion of such application operation, the polyvinylchloride film is peeled off in its lengthwise direction at a speed of 100 mm per minute to measure the 180° direction peel forces.

The measured values are shown in TABLE - I below. It will be understood that the peel force is greatly increased as compared with the Examples wherein no polyamide resin is present. Particularly, it is noticed that the peel forces at relatively low temperatures, such as, for example, −10°C., are extremely increased and quite preferable when the amount of polyamide resin is in the range between 6 and 30 parts by weight per 100 parts by weight of nitrile rubber. At relatively high temperatures, such as for example 80°C., the peel force is also improved when the amount of polyamide resin in about 10 parts by weight per 100 parts by weight of nitrile rubber. Further, at room temperatures, such as 25°C., the peel forces are also increased.

The above mentioned increase in the peel force is believed to be caused by the fact that the nitrile rubber and the polyamide resin in the adhesive composition are bound to each other as mentioned above. In addition, the polyamide resin in the adhesive composition are bound to each other as mentioned above. In addition, the polyamide resin in the adhesive composition is quite stable chemically and physically to the plasticizer or dioctylphthalate in the polyvinylchloride film, and hence a desirable adhesive condition is maintained between the polyvinylchloride film and the adhesive composition layer, and there is no danger of the contraction of the polyvinylchloride film.

EXAMPLE 3

The application of polyvinylchloride film onto an iron plate as described in Example 2 is repeated except that here there is employed, a temperature in the range of 60° to 80°C., a pressure at the adhesion time of 0.8 Kg/cm², and an adhesion time of 60 seconds.

The measured 180° directions peel forces of thus applied polyvinylchloride film are shown in TABLE - II below. The data shows that, even with an adhesion under a vacuum state, the peel forces at low, high and room temperatures are greatly increased as was similarly noticed in Example 2.

EXAMPLE 4

A biaxially elongated polyethylene film produced by high-tension method and having a thickness of about 64 microns is coated by an adhesive composition which has prepared as mentioned above. The resulting coating is then dried at a temperature of 80°C. for 3 minutes to form an adhesive layer of about 30 microns thick on the polyethylene film. Next, the aforesaid polyethylene film is laminated on its adhesive side to an aluminum foil of about 50 microns thickness which foil is preliminarily defatted by toluene.

The aluminum foil is pressed there against at a temperature of 80°C. under a pressure of 3 Kg/cm² for 30 seconds. Thereafter, the aluminum foil is peeled off in its lengthwise direction at a speed of 100 mm per second to measure the 180° direction peel forces.

The measured peel forces are shown in TABLE - III below. As is apparent from TABLE - III, the peel forces at low, high and normal temperatures are all greatly increased as compared with the examples wherein no polyamide resin is present. For example, the peeling forces at a temperature of 80°C. are increased more than three times that of a conventional adhesive composition containing no polyamide resin which prior art composition has a peel force of 0.6 Kg/cm² at the maximum.

EXAMPLE 5

An adhesive composition which has prepared as mentioned above is coated on an aluminum plate of about 300 microns thickness and dried at a temperature of 80°C to form an adhesive layer of 50 g/m² on such aluminum plate. This plate is previously defatted with toluene. Next, after being left at a room temperature for 5 minutes, this plate is laminated at its adhesive layer side to an aluminum foil of about 50 microns thickness and the resulting composition is left as is at room temperature for 5 days. This foil is previously defatted with toluene.

Thereafter, the aluminum plate is peeled away at a speed of 100 mm per minute to measure 180° direction peel forces.

The measured peel forces are shown in TABLE - IV below. It is noticed that the peel forces are greatly increased as compared with the example wherein no polyamide resin is present.

EXAMPLE 6 (Comparison)

Hycar-1042 and Hycar-1432, each commercially available from Goodrich Co., nitrile rubbers without pendant carboxyl groups (each copolymer of 35% of acrylonitrile and 65% butadiene, with a Mooney viscosity of 70~95 $ML_8$ (100°C.) and a molecular weight more than $10^5$ are dissolved in a methyl-ethyl-ketone solvent to prepare a rubber solution which contains a solid component of 20% by weight (total weight basis). Next, the respective polyamide resins used in the above described Example 1 are mixed in this rubber solution at various rates to produce a series of adhesive compositions.

These adhesive compositions are then each coated on a polyethylene film produced by high-tension method and having a thickness of about 65 microns. Each coating is laminated onto an aluminum foil of about 50 microns thickness which is previously defatted by toluene.

The resulting aluminum foil polyethylene film laminate is pressed at a temperature of 80°C. under a pressure of 3 Kg/cm² for 30 seconds. Then, the aluminum foil is peeled off at a speed of 100 mm per minute and its 180° direction peel forces are measured at a temperature of 25°C.

The measured peel forces are shown on TABLE - V below. The data shows that peel forces are generally small under the same conditions as those of Example 4 and the increasing rate of the peel force is quite low even with the polyamide resin being mixed therein.

When Hycar-1432 is used as the nitrile rubber, the maximum value of the peel force is only about 1.6 times that of the example wherein no polyamide resin is added, but the maximum value is from 3 to 4 times in the case of Example 5. Besides, when Hycar-1042 is employed as the nitrile rubber, the peel force is increased more than 3 times, but it is generally quite small. This is believed caused by the fact that Hycar-1042 and Hycar-1432 each contain no pendant carboxyl groups and hence little bond can be formed between the polyamide resin and the nitrile rubber.

TABLE I

| polyamide resin | peel force | −10°C | 25°C | 80°C |
|---|---|---|---|---|
| 0 parts* | | 1.80(Kg/2cm) | 1.00(Kg/2cm) | 0.02(Kg/2cm) |
| 2 | " | 4.20 " | 2.04 " | 0.22 " |
| 6 | " | 6.00 " | 2.00 " | 0.82 " |
| 10 | " | 6.70 " | 2.30 " | 1.16 " |
| 30 | " | 7.30 " | 2.30 " | 0.75 " |
| 50 | " | 4.40 " | 1.35 " | 0.50 " |

*weight parts against 100 weight parts of nitrile rubber

TABLE II

| polyamide resin | peel force | −10°C | 25°C | 80°C |
|---|---|---|---|---|
| 0 parts* | | 1.40(Kg/2cm) | 0.80(Kg/2cm) | 0.01(Kg/2cm) |
| 2 | " | 4.10 " | 2.00 " | 0.45 " |
| 6 | " | 5.80 " | 2.15 " | 0.64 " |
| 10 | " | 6.20 " | 2.20 " | 1.24 " |
| 30 | " | 7.00 " | 2.40 " | 0.80 " |
| 50 | " | 5.00 " | 1.56 " | 0.54 " |

*weight parts against 100 weight parts of nitrile rubber

TABLE III

| polyamide resin | peel force | −10°C | 25°C | 80°C |
|---|---|---|---|---|
| 0 parts* | | 1.40(Kg/2cm) | 0.60(Kg/2cm) | 0.01(Kg/2cm) |
| 2 | " | 2.50 " | 2.0 " | 1.60 " |
| 6 | " | 2.80 " | 2.15 " | 1.80 " |
| 10 | " | 3.10 " | 2.40 " | 2.10 " |
| 30 | " | 3.40 " | 2.30 " | 1.40 " |
| 50 | " | 3.00 " | 1.90 " | 1.00 " |

*weight parts against 100 weight parts of nitrile rubber

TABLE IV

| polyamide resin | peel force | −10°C | 25°C | 80°C |
|---|---|---|---|---|
| 0 parts* | | 1.20(Kg/2cm) | 0.40(Kg/2cm) | 0.01(kg/2cm) |
| 2 | " | 2.50 " | 1.80 " | 1.50 " |
| 6 | " | 2.70 " | 2.00 " | 1.80 " |
| 10 | " | 3.00 " | 2.20 " | 2.00 " |
| 30 | " | 3.20 " | 2.30 " | 1.30 " |
| 50 | " | 3.00 " | 2.00 " | 0.80 " |

*weight parts against 100 weight parts of nitrile rubber

TABLE V

| polyamide resin | peel force | (25°C) Hycar 1042 | Hycar 1432 |
|---|---|---|---|
| 0 parts* | | 0.07(Kg/2cm) | 0.25(Kg/2cm) |
| 10 | " | 0.23 " | 0.40 " |
| 30 | " | 0.20 " | 0.35 " |
| 50 | " | 0.18 " | 0.25 " |

*weight parts against 100 weight parts of nitrile rubber

We claim:

1. An adhesive composition comprising in intimate admixture,
   A. a nitrile rubber with carboxyl groups
      1. said nitrile rubber being a terpolymer comprised of acrylonitrile, butadiene, and on a 100 weight basis, from about 0.5 to 7 weight percent of at least one material selected from the group consisting of acrylic acid and methacrylic acid,
      2. the weight ratio of acrylonitrile to butadiene in said nitrile rubber ranging from about 15/85 to 50/50,
      3. said nitrile rubber having a molecular weight greater than about $10^5$, and a Mooney viscosity of from about 40 to 75 $ML_8$ at 100°C.
      4. said nitrile rubber having an initial solubility such that at most about 28 parts by weight thereof are soluble in 100 parts by weight of methyl ethyl ketone at ambient temperatures, and
   B. a polyamide resin formed by the condensation polymerization of polymeric fatty acids with an alkylene-polyamine
      1. said polymeric fatty acids being polymerized from monocarboxylic aliphatic acids having from 8 through 24 carbon atoms per molecule, and having a molecular weight ranging from about 140 to 400,
      2. said alkylene-polyamines being characterized by having the generic formula: $H_2N-(CH_2-CH_2-NH)_n-H$ where $n$ is an integer from 1 through 5,
      3. said polyamide resin having an amine value of from about 90 to 350 and by having a molecular weight of from about 500 to 5000,
   C. the weight ratio of said polyamide resin to said nitrile rubber in said adhesive composition ranging from about 0.5/100 to 1/1.

2. A fluid adhesive composition adapted for coating upon a solid substrate surface, said fluid adhesive composition comprising on a 100 weight percent total fluid composition basis:
   A. from about 10 to 55 weight percent of an adhesive composition of claim 1 with,
   B. the balance up to 100 weight percent of any given such fluid composition being an inert, volatile organic liquid,
   C. said adhesive composition of claim 1 being uniformly dispersed throughout said organic liquid.

3. A laminate structure comprising,
   A. a sheet member comprised of an organic polymer, said sheet member having a thickness of from about 50 to 500 microns,
   B. a layer of an adhesive composition of claim 1 deposited upon at least a portion of one face of said sheet member, said layer having a thickness of from about 40 to 60 microns.

4. The laminate structure of claim 3 wherein said sheet member is releasable from said layer.

5. The laminate structure of claim 4 wherein said sheet member is comprised of a polyolefin.

6. The laminate structure of claim 5 wherein said sheet member is comprised of biaxially oriented polyethylene.

7. The laminate structure of claim 3 wherein said sheet member is comprised of a plasticized vinyl polymer.

8. The laminate structure of claim 7 wherein said plasticized vinyl polymer comprises on a 100 weight percent total composition basis, A. from about 85 to 65 weight percent of at least one vinyl polymer and
B. from about 15 to 35 weight percent of a phthalate plasticizer.

9. The laminate structure of claim 8 wherein said vinyl polymer comprises polyvinylchloride.

10. The adhesive composition of claim 1 wherein said nitrile rubber is comprised on a 100 weight percent total nitrile rubber basis of from about 30 to 40 weight percent acrylonitrile, from about 60 to 70 weight percent butadiene, and from about 1 to 3 weight percent acrylic acid and said nitrile rubber has a Mooney viscosity of from about 42 to 62 $ML_8$ at 100°C.

11. The adhesive composition of claim 10 wherein said nitrile rubber is comprised on a 100 weight percent total composition basis of about 35 weight percent acrylonitrile, about 63 weight percent butadiene, and about 2 weight percent acrylic acid.

12. The adhesive composition of claim 1 wherein, in said polyamide resin,
A. said polymeric fatty acids are comprised on a 100 weight percent total polymeric fatty acid basis of from about 70 to 80 weight percent dimers, from about 15 to 30 weight percent trimers, and from about 1 to 5 weight percent monomers, and
B. said alkylene-polyamine is selected from the group consisting of ethylene diamine, diethylene triamine, and triethylene tetramine,
and in addition, said polyamide resin has a molecular weight such that its viscosity ranges from about 5000 to 80000 cps at 40°C. by Brookfield viscometer and further has an amine value in the range from about 90 to 360.

13. The adhesive composition of claim 12 wherein said polyamide resin has a viscosity in the range from about 8,000 to 12,000 cps at 40°C. by Brookfield viscometer and has an amine value of about 300±20.

14. The laminate structure of claim 3 wherein said nitrile rubber is comprised on a 100 weight percent total composition basis of from about 30 to 40 weight percent acrylonitrile, from about 60 to 70 weight percent butadiene, and from about 1 to 3 weight percent acrylic acid, and said nitrile rubber has a Mooney viscosity of from about 42 to 62 $ML_8$ at 100°C.

15. The laminate structure of claim 14 wherein said nitrile rubber is comprised on a 100 weight percent total composition basis of about 35 weight percent acrylonitrile, about 63 weight percent butadiene, and about 2 weight percent acrylic acid.

16. The laminate structure of claim 3 wherein said polyamide resin,
A. said polymeric fatty acids are comprised on a 100 weight percent total polymeric fatty acid basis of from about 70 to 80 weight percent dimers, from about 15 to 30 weight percent trimers, and from about 1 to 5 weight percent monomers, and
B. said alkylene-polyamine is selected from the group consisting of ethylene diamine, diethylene triamine, and triethylene tetramine,
and, in addition, said polyamide resin has a molecular weight such that its viscosity ranges from about 5,000 to 80,000 cps at 40°C. by Brookfield viscometer and further has an amine value in the range from about 90 to 360.

17. The adhesive composition of claim 16 wherein said polyamide resin has a viscosity in the range from about 8,000 to 12,000 cps at 40°C. by Brookfield viscometer and has an amine value of aobut 300±20.

18. The adhesive composition of claim 1 wherein the weight ratio of said polyamide resin to said nitrile rubber ranges from about 3 to 30 per 100.

19. A laminate structure comprising,
A. a substrate comprised of metal and having at least one generally smooth face,
B. a layer of an adhesive composition of claim 1 deposited upon at least a portion of said smooth face,
C. a superstrate bonded to said layer.

20. The laminate structure of claim 19 wherein said substrate comprises aluminum.

* * * * *